United States Patent [19]

Yoshimura et al.

[11] Patent Number: 5,030,863
[45] Date of Patent: Jul. 9, 1991

[54] COOLING SYSTEM FOR SUPERCONDUCTING ROTATING MACHINE

[75] Inventors: Hideto Yoshimura; Toshiyuki Amano, both of Amagasaki, Japan

[73] Assignee: Mitsubishi Denki Kabushiki Kaisha, Japan

[21] Appl. No.: 480,372

[22] Filed: Feb. 14, 1990

Related U.S. Application Data

[63] Continuation of Ser. No. 217,295, Jul. 11, 1988, abandoned.

[30] Foreign Application Priority Data

| Jul. 24, 1987 | [JP] | Japan | 62-185953 |
| Sep. 4, 1987 | [JP] | Japan | 62-222515 |
| Sep. 4, 1987 | [JP] | Japan | 62-222516 |
| Sep. 4, 1987 | [JP] | Japan | 62-222517 |

[51] Int. Cl.$^5$ .......................................... H02K 9/00
[52] U.S. Cl. ........................... 310/52; 310/54; 310/59; 310/198; 310/261
[58] Field of Search ............ 310/10, 40 R, 52, 54, 310/62, 63, 55, 57, 58, 59, 64, 165, 60 R, 254, 261, 198, 179, 188, 184; 335/216; 505/1, 705, 706, 735

[56] References Cited

U.S. PATENT DOCUMENTS

| 2,906,103 | 9/1959 | Saltzman | 310/52 |
| 3,659,125 | 4/1972 | Basel | 310/54 |
| 4,063,122 | 12/1977 | Kullmann | 310/10 |
| 4,284,913 | 8/1981 | Barnhardt | 310/54 |
| 4,642,503 | 2/1987 | Ueda et al. | 310/214 |
| 4,649,303 | 3/1987 | Hirao | 310/52 |
| 4,658,170 | 4/1987 | Ueda | 310/214 |
| 4,740,724 | 4/1988 | Sato | 310/52 |
| 4,774,429 | 9/1988 | Ueda | 310/52 |
| 4,797,386 | 1/1989 | Gyorgy | 505/1 |

OTHER PUBLICATIONS

"Superconductor World Report", vol. 1/No. 1; 12/1987.
"Fabrication of 91K Superconducting Coils", S. Jin et al.; Proc. Mat's Research Soc. Meeting; 04/21-24/1987; Anaheim, CA.
"High to Superconductors-Composite Wire Fabrication", S. Jin et al.; A.T.&T. Bell Lab's; Murray Hill, N.J.; 05/22/87.
New Collegiate Dictionary; G. & C. Merriam Co.; Springfield, Mass., U.S.A., pp. 786, 809.
T. E. Laskaris, "A Cooling Concept for Improved Field Winding Performance in Large Superconducting AC Generators", Cryogenics, Apr. 1977.
Smith et al., "Results From the MIT-EPRT 3-MVS Superconducting Alternator", IEEE Transactions on Magnetics, vol. MAG-13, No. 1, Jan. 1977.
Marquet et al., "Cryogenerator Development Program-Model Rotor first Operational Results and Industrial Conclusions", pp. 408-411, published 1982.
Kubo et al., "Superconducting Properties of . . . Powder Process", Proceedings of Sixth International Cryogenic Materials Conference, Aug. 1985, pp. 1085-1091.

Primary Examiner—R. Skudy
Attorney, Agent, or Firm—Leydig, Voit & Mayer

[57] ABSTRACT

A superconducting rotating electric machine has superconducting rotor windings made from a high-temperature superconductor having a critical temperature of at least 78° K. The rotor windings are cooled by a liquid coolant such as liquid nitrogen which is sprayed from the stator directly at the outer surface of the rotor.

12 Claims, 9 Drawing Sheets

COOLING SYSTEM FOR SUPERCONDUCTING ROTATING MACHINE

This application is a continuation of Application Ser. No. 07/217,295, filed July 11, 1988 now abandon.

BACKGROUND OF THE INVENTION

This invention relates to a superconducting rotating electric machine having a rotor whose windings are formed from a high-temperature superconductor. More particularly, it relates to a superconducting rotating electric machine having a novel cooling mechanism for cooling the rotor windings.

Until recently, the rotor windings of superconducting rotating electric machines were made from conventional superconductors such as NbTi and $Nb_3Sn$ which have a critical temperature of at most 20 K. Because of their extremely low critical temperature, these conventional superconductors must be cooled by liquid helium. In a conventional superconducting rotating electric machine, the rotor windings were kept constantly immersed in liquid helium which was introduced into the inside of the rotor from one of its ends. The liquid helium cooled the rotor windings by evaporating and absorbing heat from the rotor windings. The vaporized helium was then removed from the rotor via one of its ends.

The latent heat of vaporization of liquid helium is extremely small, so in order to efficiently cool superconducting rotor windings, the rotor must be very carefully insulated. Therefore, the portion of the rotor which houses the rotor windings is generally separated from other parts of the rotor by a high vacuum.

Because of the difficulty of supplying liquid helium to the inside of a rotor which is rotating at a high speed, the structure of conventional superconducting rotors is extremely complex. Not only is the piping for supplying the helium complex, but it is also necessary to provide a mechanism for absorbing thermal strains which develop within the rotor.

Furthermore, it is difficult to maintain a high vacuum within the rotor over a long period of a year or more, and therefore conventional rotating electric machines have problems with respect to reliability.

SUMMARY OF THE INVENTION

It is the object of the present invention to provide a superconducting rotating electric machine having a superconducting rotor with a structure which is as simple as that of a rotor of a non-superconducting rotating electric machine.

In the present invention, a superconducting rotating electric machine employs superconducting rotor windings which are formed from a high-temperature superconductor. The rotor windings are cooled by spraying a liquid coolant having a boiling point below the critical temperature of the superconductor directly at the outer surface of the rotor.

A superconducting rotating machine in accordance with the present invention comprises a rotor, a superconducting rotor winding which is supported by the rotor and which is formed from a high-temperature superconductor having a critical temperature of at least 78 K, a stator which surrounds the rotor, a stator winding which is supported by the stator, and cooling means for spraying a liquid coolant having a boiling point of at most the critical temperature of the high-temperature superconductor at the outer surface of the rotor.

The term "high-temperature superconductor" is used herein to mean a superconductor which has a critical temperature which is at least as high as the boiling point of liquid nitrogen (78K). Any superconductor having a suitable critical temperature can be employed, examples of which are superconducting oxides such as Y-Ba-Cu-O.

The cooling means comprises a plurality of spraying elements which are disposed on the inner surface of the stator and confront the outer surface of the rotor, and a coolant supply means for supplying a liquid coolant under pressure to the spraying elements. In preferred embodiments, the spraying elements comprise nozzles which are embedded in the inner surface of the stator or in an insulating layer which lines the inner surface of the stator, but other types of spraying elements may be used instead, such as orifices.

In preferred embodiments, liquid nitrogen is employed as the liquid coolant for cooling the rotor windings, but any liquid coolant may be used which has a boiling point below the critical temperature of the superconductor which is employed for the rotor windings, such as methane, ammonia, and Freon type coolants.

The stator windings can be formed from either a conventional conductor or from a high-temperature superconductor. In the latter case, the stator windings can be cooled by a cooling means in the form of pipes which are embedded within the stator windings and a means for passing liquid coolant through the pipes. In a preferred embodiment, the same liquid coolant which is used to cool the rotor windings is passed through the pipes so as to cool the stator windings.

The rotor may be further equipped with guides which protrude from its outer surface in the direction of rotation of the rotor. The guides serve to prevent the liquid coolant which is sprayed at the rotor by the spraying elements from separating from the rotor surface after striking the surface, thereby increasing the uniformity of cooling.

The direction in which the spray of liquid coolant is sprayed by the cooling means can be either perpendicular to the surface of the rotor, or it can be at an angle with respect to the surface of the rotor so as to increase the cooling effect. If the direction of the center of the spray of coolant is sloped such that it has a component in the direction of rotation of the rotor, the separation of the coolant from the rotor after it strikes the surface of the rotor can be decreased, thereby increasing the uniformity of cooling. If the direction of the center of the spray is sloped such that it has a component in the opposite direction from the rotational direction of the rotor, the speed of the spray relative to the rotor upon impacting the surface of the rotor will be increased, thereby increasing the cooling effect. The spray of liquid coolant can also be directed so that it has a component in the axial direction of the rotor in which case the liquid coolant will spiral around the surface of the rotor and produce a still greater cooling effect.

BRIEF DESCRIPTION OF THE DRAWINGS

In the figures, the same reference numerals indicate the same or corresponding parts.

DESCRIPTION OF THE PREFERRED EMBODIMENTS

Figure 1:
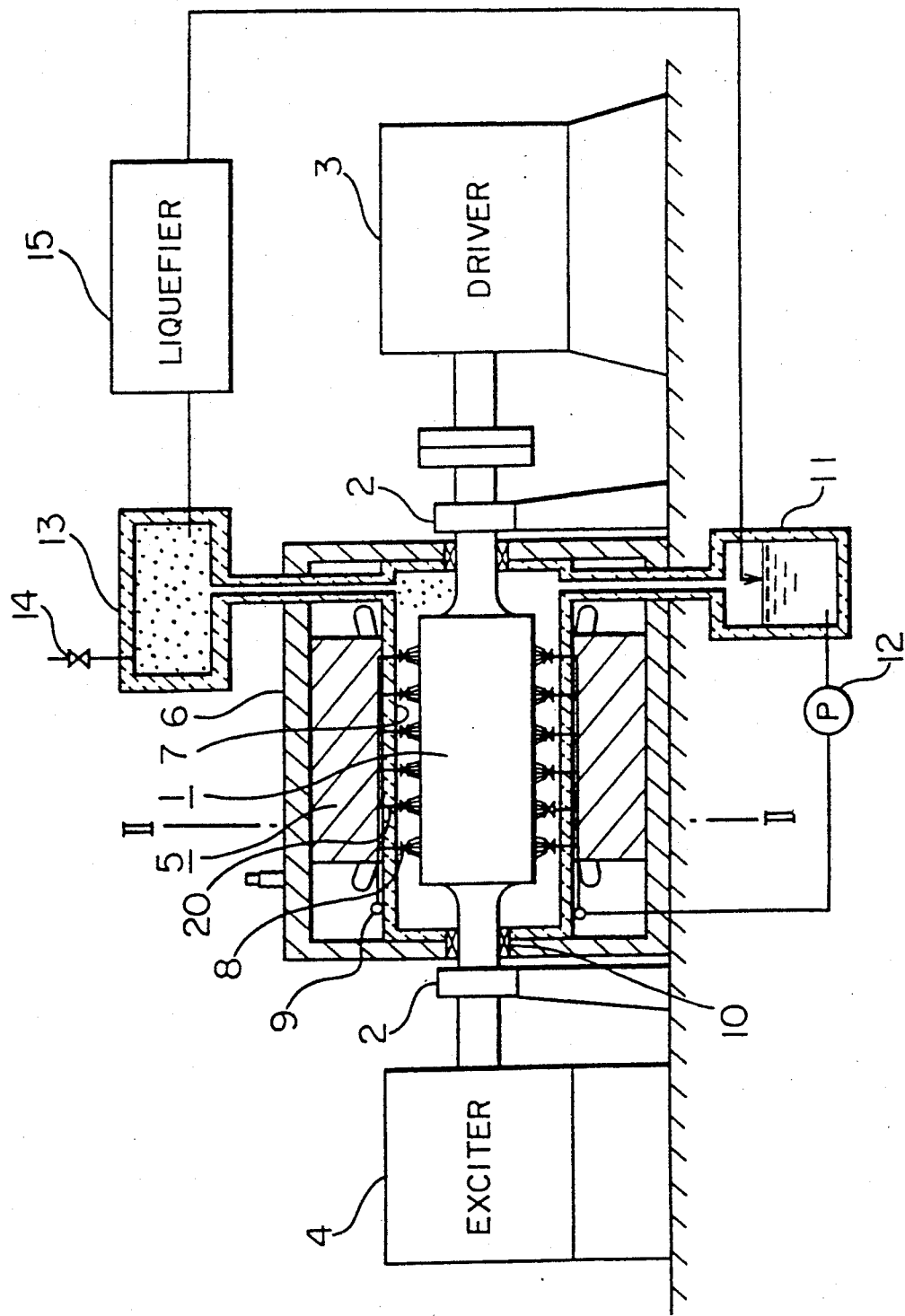
FIG. 1 is a schematic cross-sectional view of a first embodiment of a superconducting rotating electric machine in accordance with the present invention.

Hereinbelow, a number of preferred embodiments of a superconducting rotating electric machine in accordance with the present invention will be described while referring to the accompanying drawings, FIGS. 1 and 2 which illustrate a first embodiment. This embodiment is in the form of a generator. As shown in FIG. 1, this first embodiment has a rotor 1 which is journalled by two bearings 2. One end of the rotor 1 is connected to a drive portion 3 which rotates the rotor 1, while the other end is connected to an exciter 4 which provides exciting current to the rotor windings. The rotor 1 is surrounded by and separated from a stator 5. The rotor 1 and the stator 5 are surrounded by a housing 6 which is lined with a magnetic shield 17, shown in FIG. 2. Two bearing seals 10 are mounted in the walls of the housing 6 around the end portions of the rotor 1 which pass through the housing 6. The bearing seals 10 prevent gases and liquids within the housing 6 from leaking into the atmosphere. A layer of thermal insulation 7 is formed on the inner surface of the stator 5 and completely surrounds that portion of the rotor 1 which is inside the housing 6. The purpose of the thermal insulation 7 is to insulate the rotor 1 from heat generated by the stator 5, the temperature of which can reach as high as 100° C. The type of thermal insulation which is employed can be chosen in accordance with the operating temperature of the superconductor forming the windings of the rotor 1. The present embodiment employs solid thermal insulation, but vacuum insulation can also be employed. A plurality of spraying elements in the form of nozzles 8 are embedded in the thermal insulation 7 with their discharge ends confronting the outer surface of the rotor 1. The nozzles 8 confront the rotor 1 along its entire length and around its entire periphery. Each of the nozzles 8 is connected to one of a plurality of coolant supply pipes 20 which extend longitudinally through the thermal insulation 7 and are spaced around the inner periphery of the stator 5. The coolant supply pipes 20 are connected via a header 9 and a pump 12 to a sump 11 containing liquid nitrogen, which serves as a liquid coolant for the rotor 1. The sump 11 communicates with the inside of the housing 6 so that liquid nitrogen will drain into the sump 11.

The inside of the housing 6 also communicates with a vapor receiver 13 for nitrogen gas which is formed by the vaporization of the liquid nitrogen. The vapor receiver 13 can be vented by means of a valve 14 which is connected thereto. The vapor receiver 13 is also connected to the intake of a liquefier 15, which liquefies the nitrogen gas within the vapor receiver 13 and returns it to the sump 11 as liquid nitrogen. The sump 11, the pump 12, the header 9, the coolant supply pipes 20, the vapor receiver 13, and the liquefier 15 together constitute coolant supply means for supplying liquid coolant under pressure to the nozzles 8, and the nozzles 8 and the coolant supply means together constitute means for cooling the rotor 1.

The exact type of liquefier 15 which is employed is not important, and if a liquid coolant other than liquid nitrogen is employed, the liquefier 15 can be selected in accordance with the properties of the liquid coolant.

Figure 2:
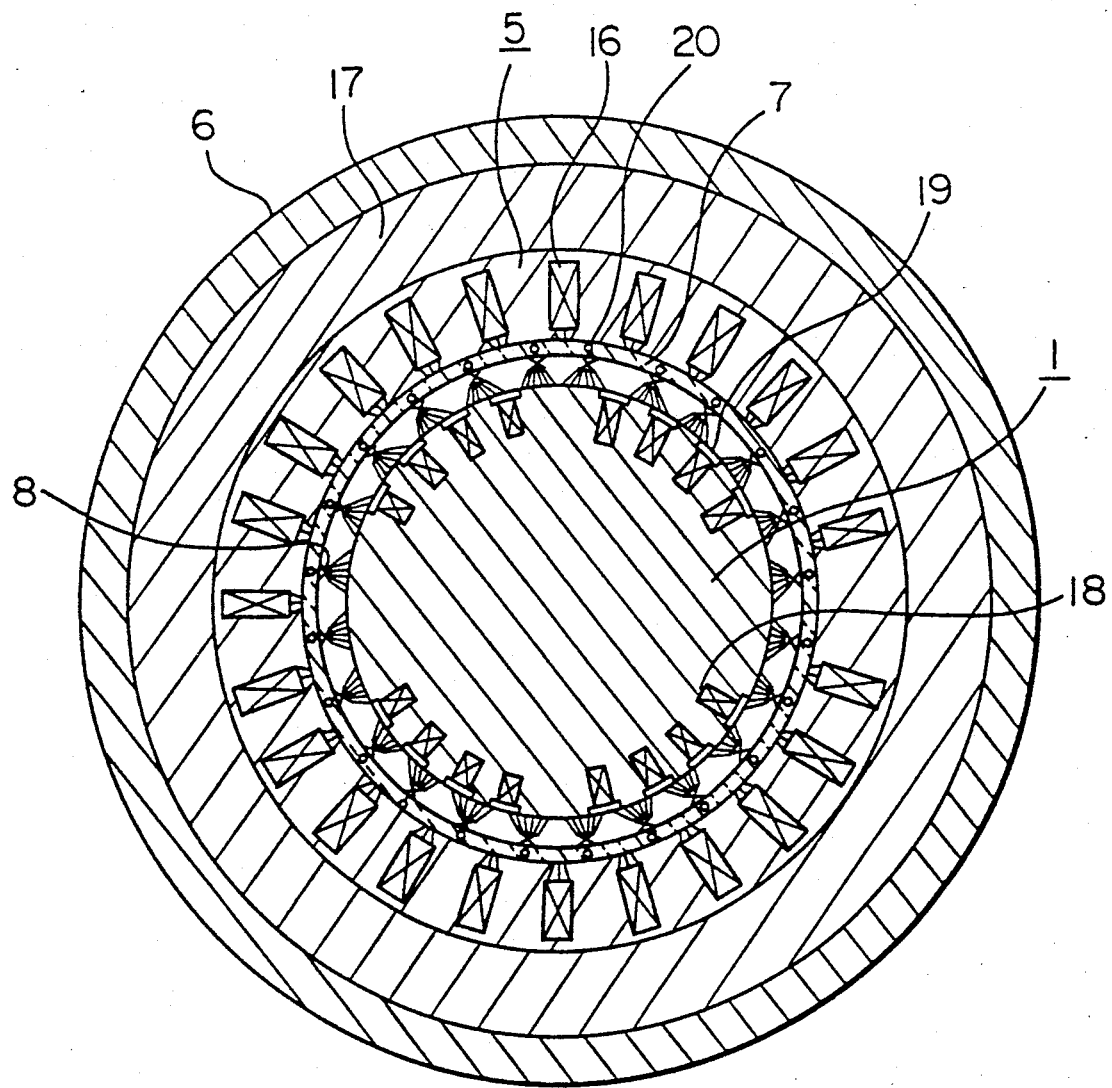
FIG. 2 is a cross-sectional view taken along Line II—II of FIG. 1.

FIG. 2, which is a cross-sectional view taken along Line II—II of FIG. 1, illustrates the structure of the rotor 1 and the stator 5 in greater detail. The rotor 1 has superconducting rotor windings 18 which are housed in a plurality of rotor slots which are formed in the rotor 1. The rotor windings 18 are secured in the rotor slots by wedges 19. The rotor windings 18 are made from a high-temperature superconductor such as Y-Ba-Cu-O which has a critical temperature which is at least as high as the boiling point of liquid nitrogen (78K). The stator 5 has conventional stator windings 16 which are made of copper. The stator 5 is surrounded by a magnetic shield 17, which in turn is surrounded by the generator housing 6. The nozzles 8 are oriented so that the center of the spray of liquid nitrogen which is discharged from each nozzle 8 is perpendicular to the surface of the rotor 1.

The operation of the embodiment illustrated in FIG. 1 is as follows. While the rotor 1 is being rotated by the drive portion 3, liquid nitrogen from the sump 11 is supplied under pressure by the pump 12 to the header 9, which distributes the liquid nitrogen to the nozzles 8 via the coolant supply pipes 20. The liquid nitrogen is sprayed directly at the surface of the rotor 1 by the nozzles 8 and cools the superconducting rotor windings 18 below their critical temperature. Most of the liquid nitrogen which strikes the surface of the rotor 1 flows downwards and into the sump 11, from which it is again supplied to the nozzles 8 by the pump 12. However, a portion of the liquid nitrogen which strikes the rotor 1 is vaporized, in the process of which it absorbs latent heat of vaporization and cools the rotor 1. The resulting nitrogen gas is collected in the vapor receiver 13. From the vapor receiver 13, it enters the liquefier 15 and then is returned to the sump 11 as liquid nitrogen.

Since liquid nitrogen is simultaneously sprayed at the entire surface of the rotor 1, it is easy to cool the rotor 1 in a relatively uniform manner. As it is not necessary to install piping for coolant within the rotor 1 or a mechanism for absorbing thermal strains within the rotor, the structure of the rotor 1 is not only far simpler than that of a conventional superconducting rotating electric machine cooled by liquid helium, but it is a simplicity which is comparable to that of the rotor of a non-superconducting rotating electric machine. In addition, as it is not necessary to insulate the rotor 1 with a vacuum, which is difficult to maintain, the reliability of the rotor 1 is increased.

Figure 3:
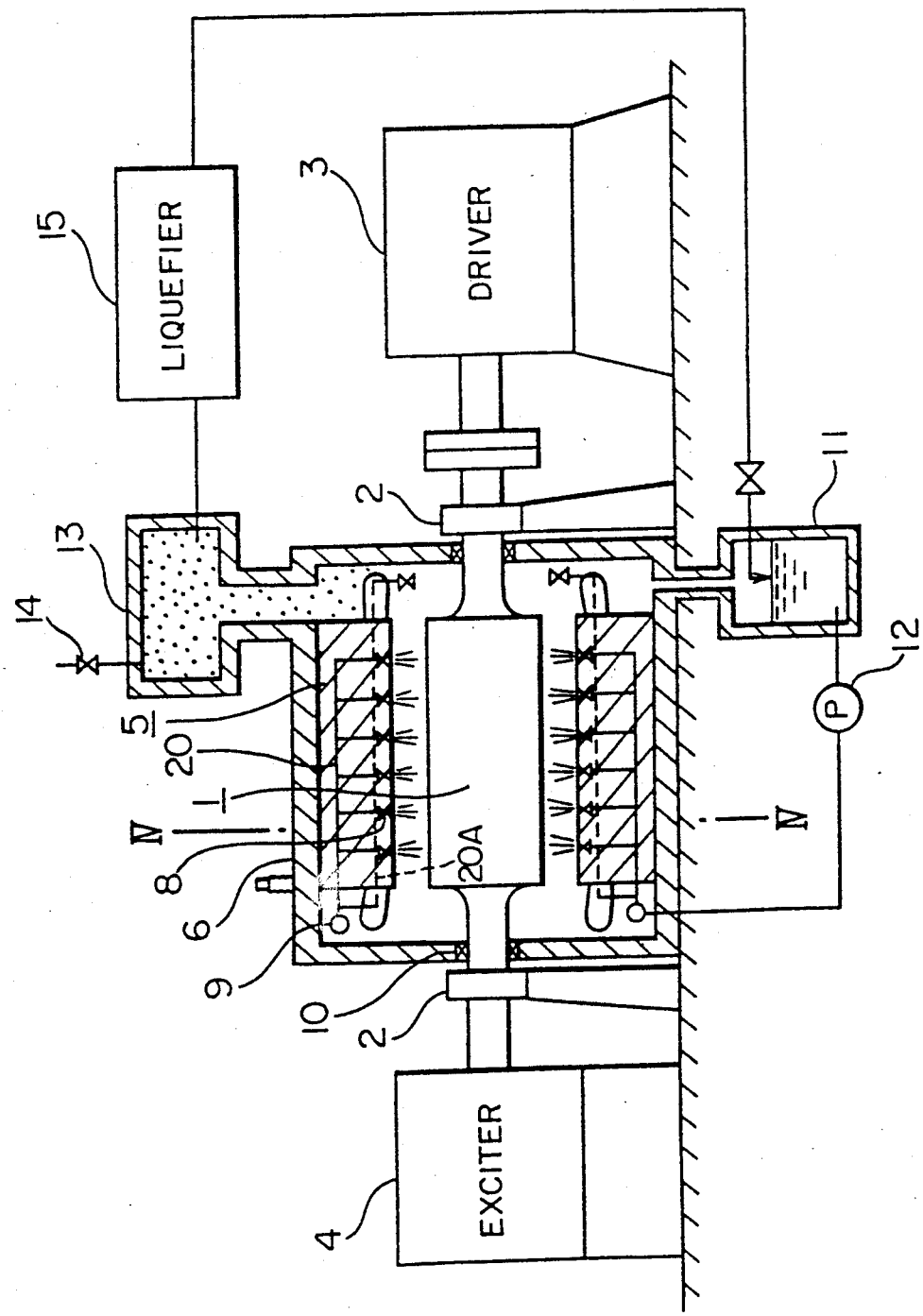
FIG. 3 is a schematic cross-sectional view of a second embodiment of the present invention.
Figure 4:
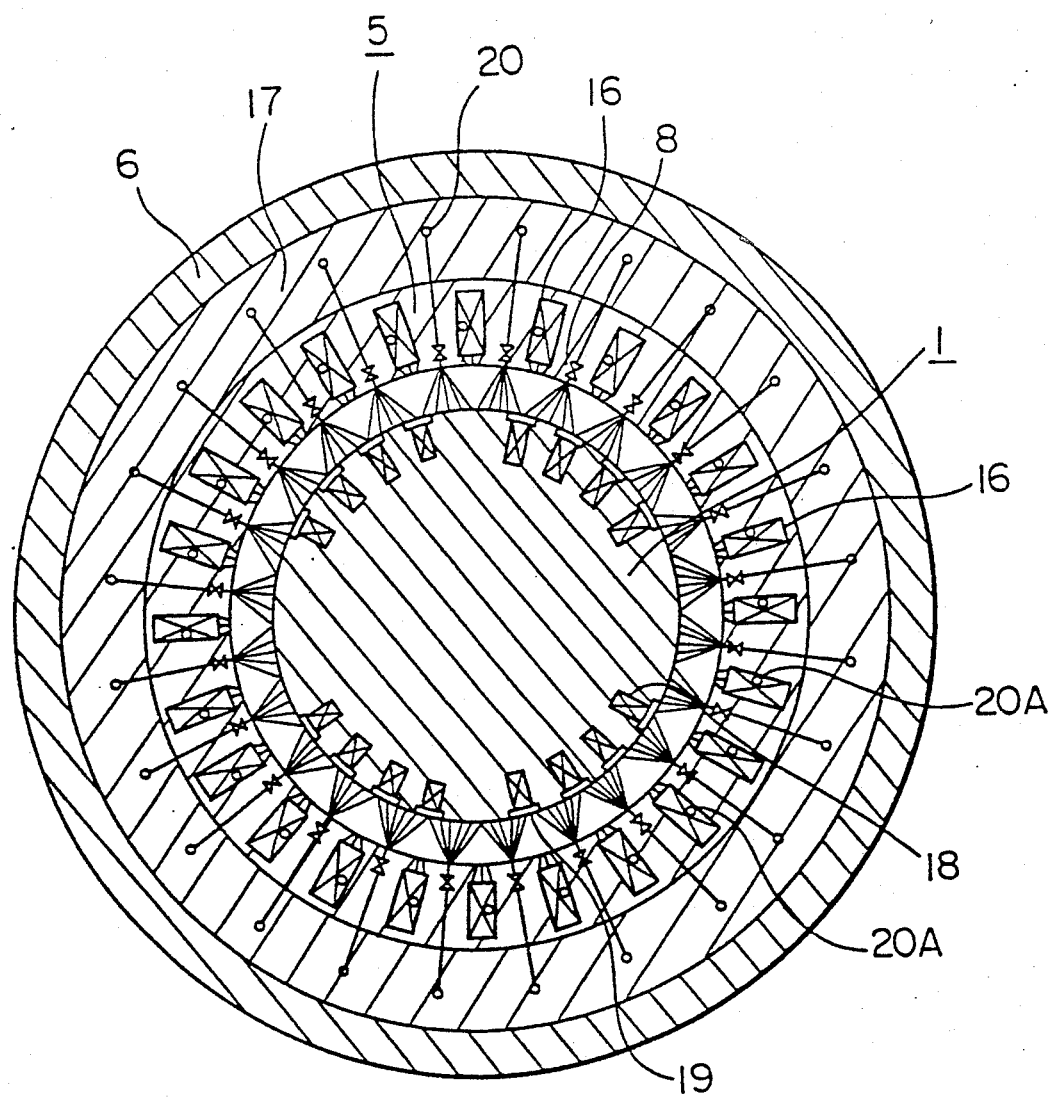
FIG. 4 is a cross-sectional view taken along Line IV—IV of FIG. 3.

In the embodiment of FIG. 1, the stator windings 16 are made of a conventional copper conductor, but it is possible for both the rotor windings 18 and the stator windings 16 to be made from a high-temperature superconductor. An embodiment having both superconducting rotor windings and superconducting stator windings is illustrated in FIGS. 3 and 4. FIG. 3 is a longitudinal cross-sectional view and FIG. 4 is a cross-sectional view taken along Line IV—IV of FIG. 3. The overall structure of this embodiment is similar to that of the previous embodiment, but as shown in FIG. 4, in contrast to the embodiment of FIG. 2, a layer of thermal insulation 7 is provided around the outer periphery of the stator 5 rather along its inner periphery. Nozzles 8 for spraying coolant at the rotor 1 are embedded in the stator 5 itself, and a plurality of coolant supply pipes 20 for the nozzles 8 extend longitudinally through the thermal insulation 7. The stator windings 16 are made of a high-temperature superconductor having a critical temperature below the boiling point of liquid nitrogen and may be made of the same substance as are the rotor windings 18. In addition to the coolant supply pipes 20 for the nozzles 8, a plurality of coolant supply pipes 20A are embedded within the superconducting stator windings 16. A coolant supply pipe 20A extends longitudinally through each of the slots for the stator windings 16. Liquid nitrogen from the sump 11 is supplied to the coolant supply pipes 20A via the header 9, and the liquid nitrogen flowing through these pipes 20A cools the stator windings 16 to below their critical temperature. The structure and operation of this embodiment are otherwise the same as for the previous embodiment, and the same effects are obtained.

Figure 5A:
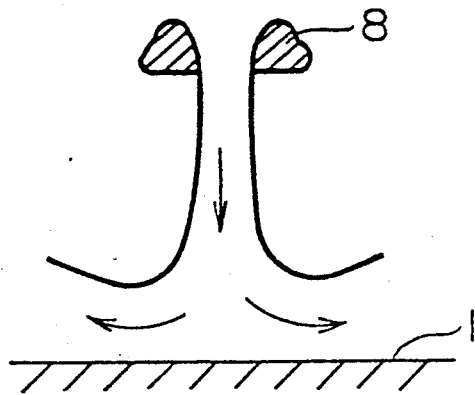
FIG. 5a is a schematic cross-sectional view illustrating the flow path of a spray of liquid coolant as it exits from a nozzle and strikes the surface of a rotor when the direction of the spray is perpendicular to the rotor surface.
Figure 6:
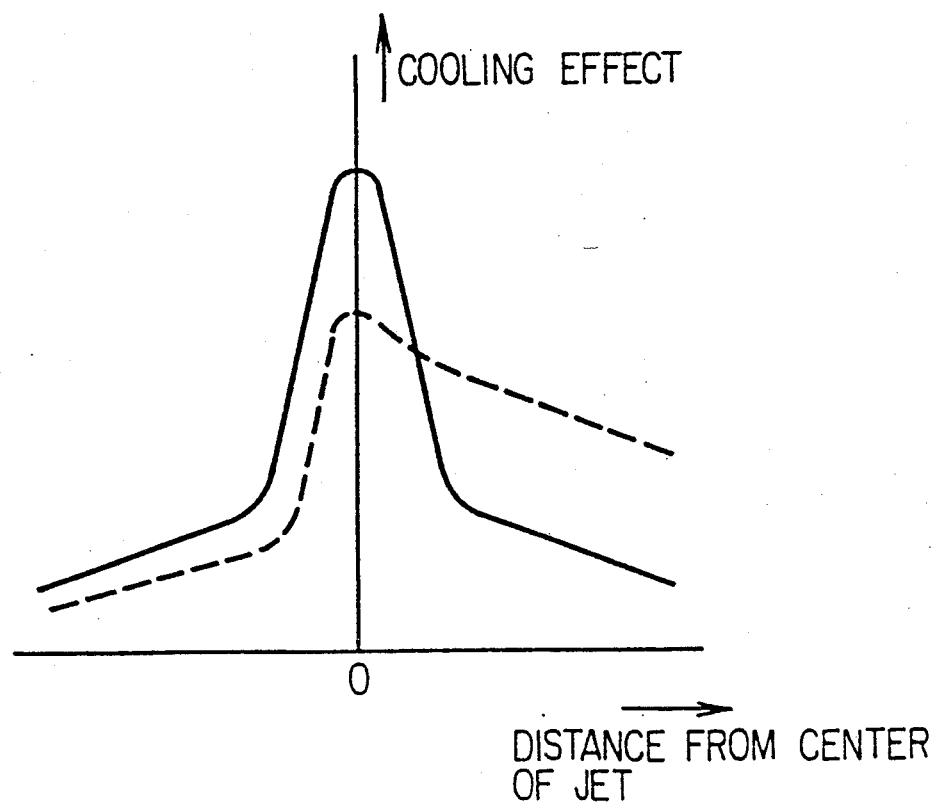
FIG. 6 is a graph showing the cooling effect produced by a spray of coolant as a function of the distance from the center of impact of the spray with the surface of a rotor. The solid line shows the case corresponding to FIG. 5a in which the coolant spray strikes the rotor surface perpendicularly, and the dashed line shows the case corresponding to FIG. 5b in which the spray of coolant strikes the rotor surface at an angle.

In both of the preceding embodiments, the nozzles 8 are positioned so that the center of the spray discharged from each nozzle 8 is perpendicular to the surface of the rotor 1. This situation is schematically illustrated in FIG. 5a, which shows the flow of liquid coolant from a nozzle 8 towards the rotor 1, the arrows indicating the direction of flow. FIG. 6 illustrates the cooling effect produced by the spray of coolant as a function of the distance from the center of where the spray impacts the rotor 1. The solid line in the figure shows the cooling effect for the nozzle orientation illustrated in FIG. 5a in which the nozzle is perpendicular to the rotor surface. A distance of 0 corresponds to a point lying along the axis of the nozzle 8. It can be seen from the figure that an extremely good cooling effect is obtained at the center of impact of the spray. However, when the direction of a spray is perpendicular to a surface, the spray soon separates from the surface, especially when the surface is rotating with respect to the spray, as is the case with a rotor, and as shown by the solid line in FIG. 6, the cooling effect rapidly decreases from the center of impact of a spray to the point where the spray separates from the surface. Thus, when the direction of spray is perpendicular to the surface of the rotor 1, the cooling effect provided by each nozzle 8 is highly ununiform.

Figure 5B:
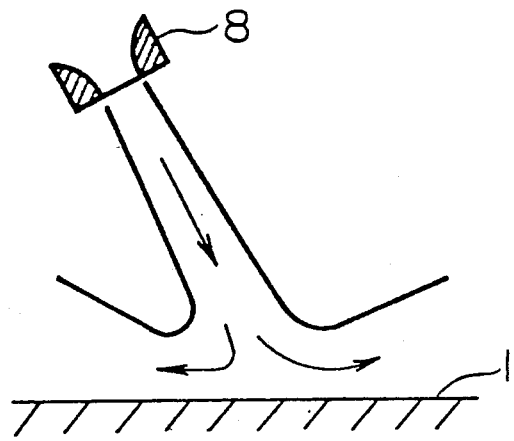
FIG. 5b is a schematic cross-sectional view illustrating the flow path of a spray of liquid coolant when the nozzle from which it is sprayed is sloped with respect to the rotor surface.
Figure 7:
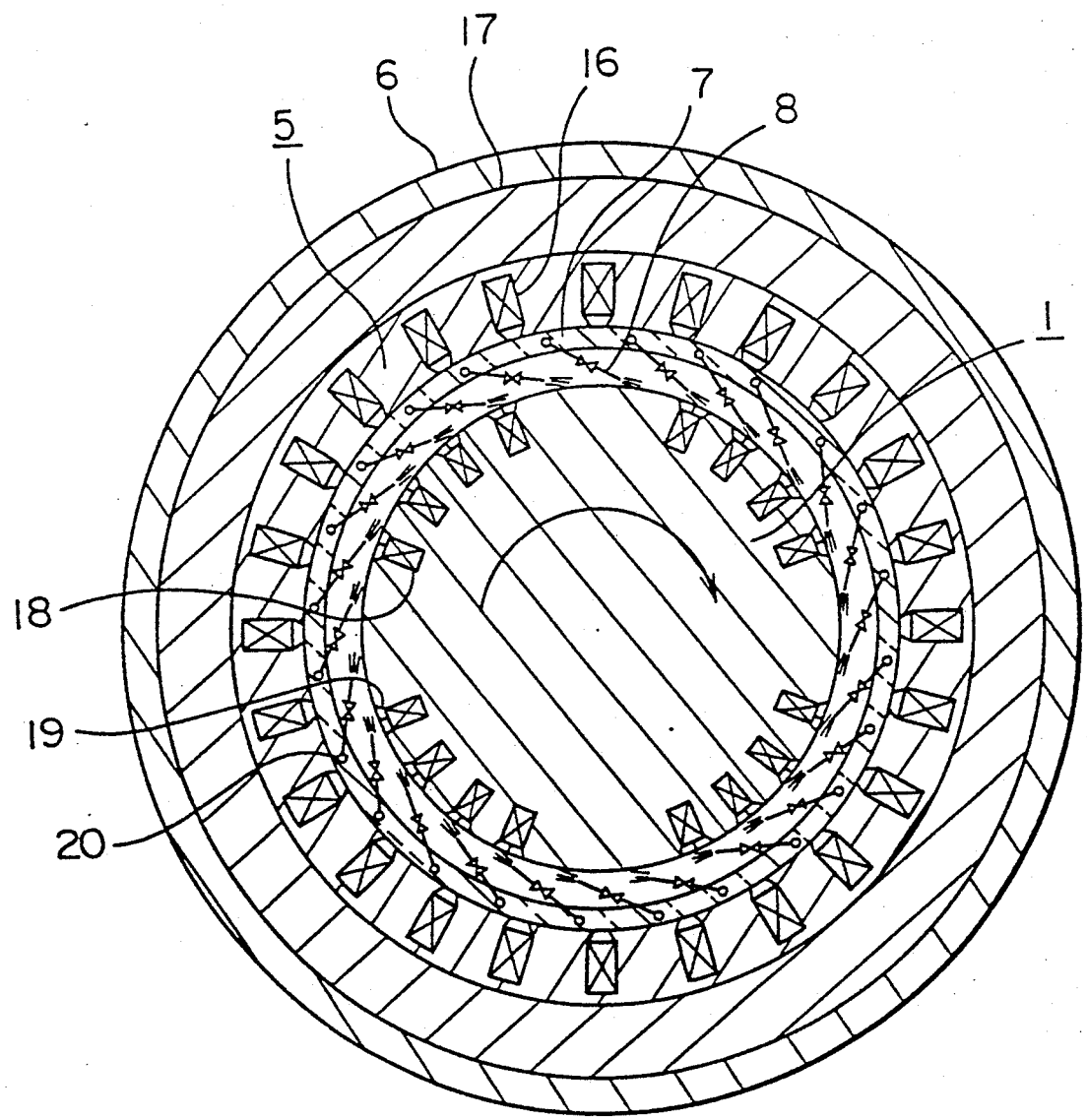
FIG. 7 is a transverse cross-sectional view of a portion of a third embodiment of the present invention.

FIG. 7 is a transverse cross-sectional view of a portion of a third embodiment of the present invention in which the cooling effect produced by each nozzle 8 is made more uniform. In this embodiment, each nozzle 8 is sloped so that the center of the spray emitted therefrom is sloped with respect to the surface of the rotor 1 in the direction of rotation of the rotor 1. Due to the sloping of the nozzles 8 with respect to the rotor 1, the coolant which is discharged from the nozzles 8 is made to adhere to and flow over the surface of the rotor 1 due to the well-known Coanda effect (also known as the wall attachment phenomenon). Therefore, the liquid coolant adheres to the surface of the rotor 1 longer than when the nozzles 8 are perpendicular to the surface of the rotor 1. FIG. 5b schematically illustrates the flow of the liquid coolant discharged from a nozzle 8 which is sloped with respect to the surface of a rotor 1, and the dashed line in FIG. 6 illustrates the resulting cooling effect. As is clear from FIG. 6, a more uniform cooling effect is obtained, and thermal stresses within the rotor 1 can be decreased.

There is no restriction on the angle between the nozzles 8 and the surface of the rotor 1, but in the present embodiment, the axis of each nozzle 8 is tangential to the surface of the rotor 1.

The structure of this embodiment is otherwise identical to that of the embodiment of FIG. 1, and the same effects are obtained. Nozzles 8 which are sloped with respect to the rotor 1 can also be applied to the embodiment of FIG. 3 which has superconducting stator windings 16.

Figure 8:
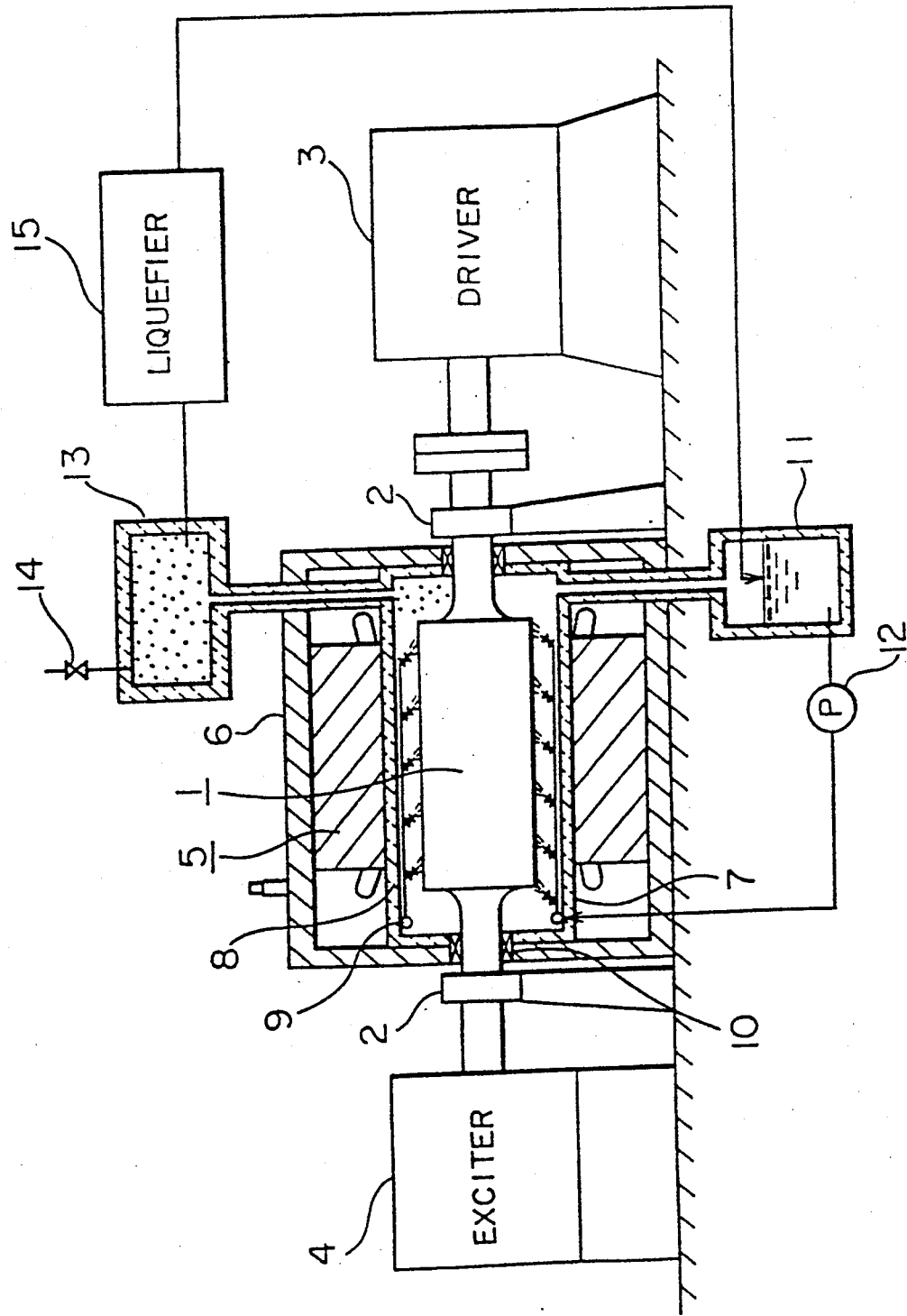
FIG. 8 is a schematic cross-sectional view of a fourth embodiment of the present invention in which the direction of the center of the spray of coolant has a component in the axial direction of the rotor.

In the embodiment of FIG. 7, the axes of all the nozzles 8 lie in a single plane which is perpendicular to the axis of the rotor 1. FIG. 8 shows another embodiment of the present invention which differs from the embodiment of FIG. 7 only in that each nozzle 8 is oriented so that the direction of the center of the spray of liquid coolant which is sprayed therefrom has a component in the axial direction of the rotor 1. Namely, when the rotor 1 is horizontal and is viewed in profile as in FIG. 8, the nozzles 8 are sloped with respect to the vertical. Sloping the nozzles 8 in this manner causes the liquid coolant which is sprayed from the nozzles 8 to spiral around the surface of the rotor 1 upon contacting it, thereby increasing the uniformity of cooling.

Figure 9:
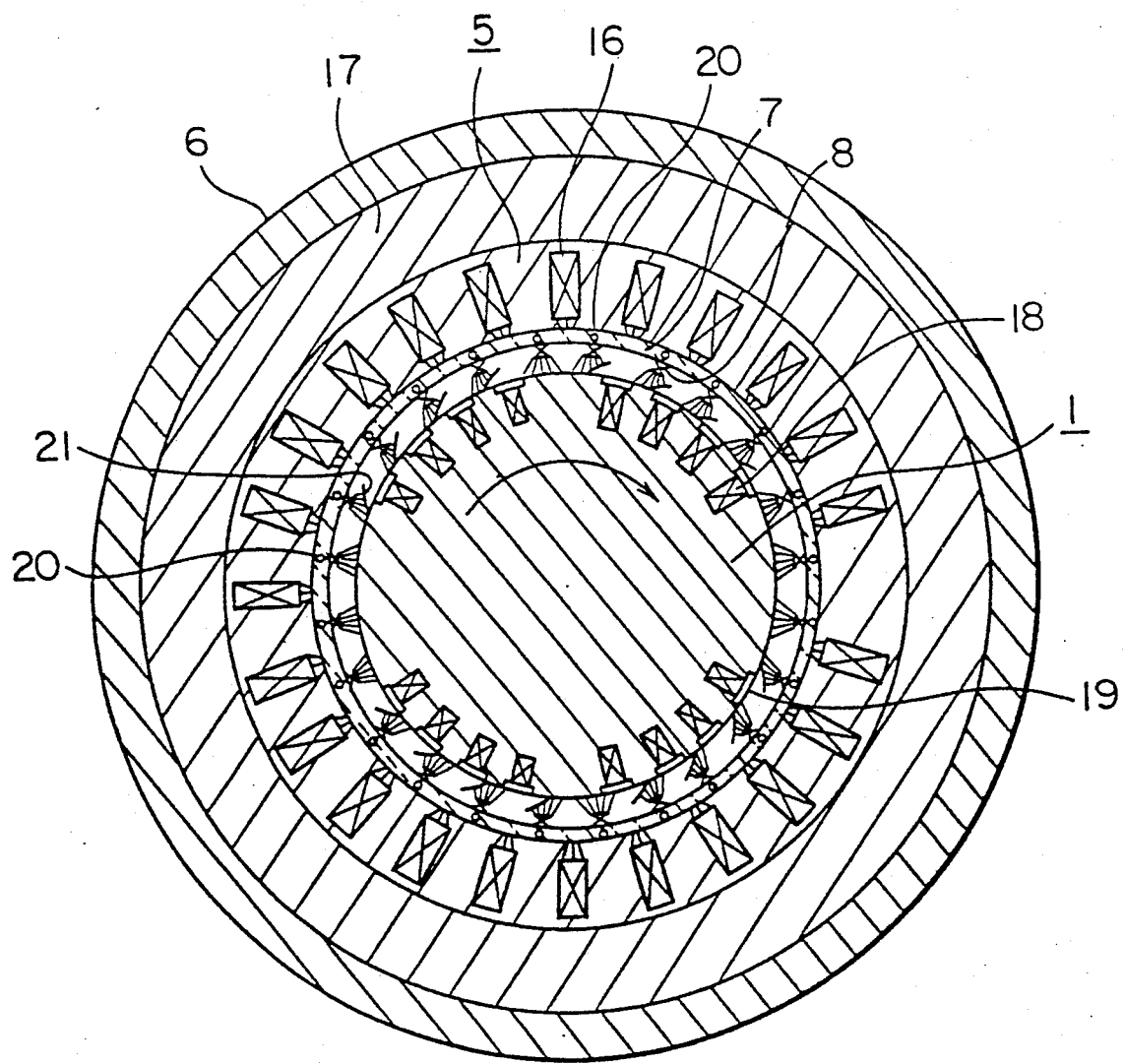
FIG. 9 is a transverse cross-sectional view of a portion of a fifth embodiment of the present invention in which the rotor is equipped with guides for coolant.

FIG. 9 is a transverse cross-sectional view of a portion of another embodiment of the present invention. This embodiment differs from the embodiment of FIG. 1 only in that a plurality of vane-shaped guides 21 are secured to the outer surface of the rotor 1. Each guide 21 extends outwards from the rotor surface and in the rotational direction (indicated by the arrow) of the rotor 1. The guides 21 serve to reduce the separation of the liquid coolant from the surface of the rotor 1 upon striking the surface. Namely, when the liquid coolant which is sprayed by the nozzles 8 strikes the rotor surface, the guides 21 take in a portion of the coolant which strikes the surface of the rotor 1 before the coolant has a chance to separate and induces a new flow of coolant over the surface of the rotor 1. The new flow of coolant has a good cooling effect and increases the uniformity of cooling. There is no restriction on the number or the shape of the guides 21. This embodiment provides the same effects as does the embodiment of FIG. 1.

Figure 10:
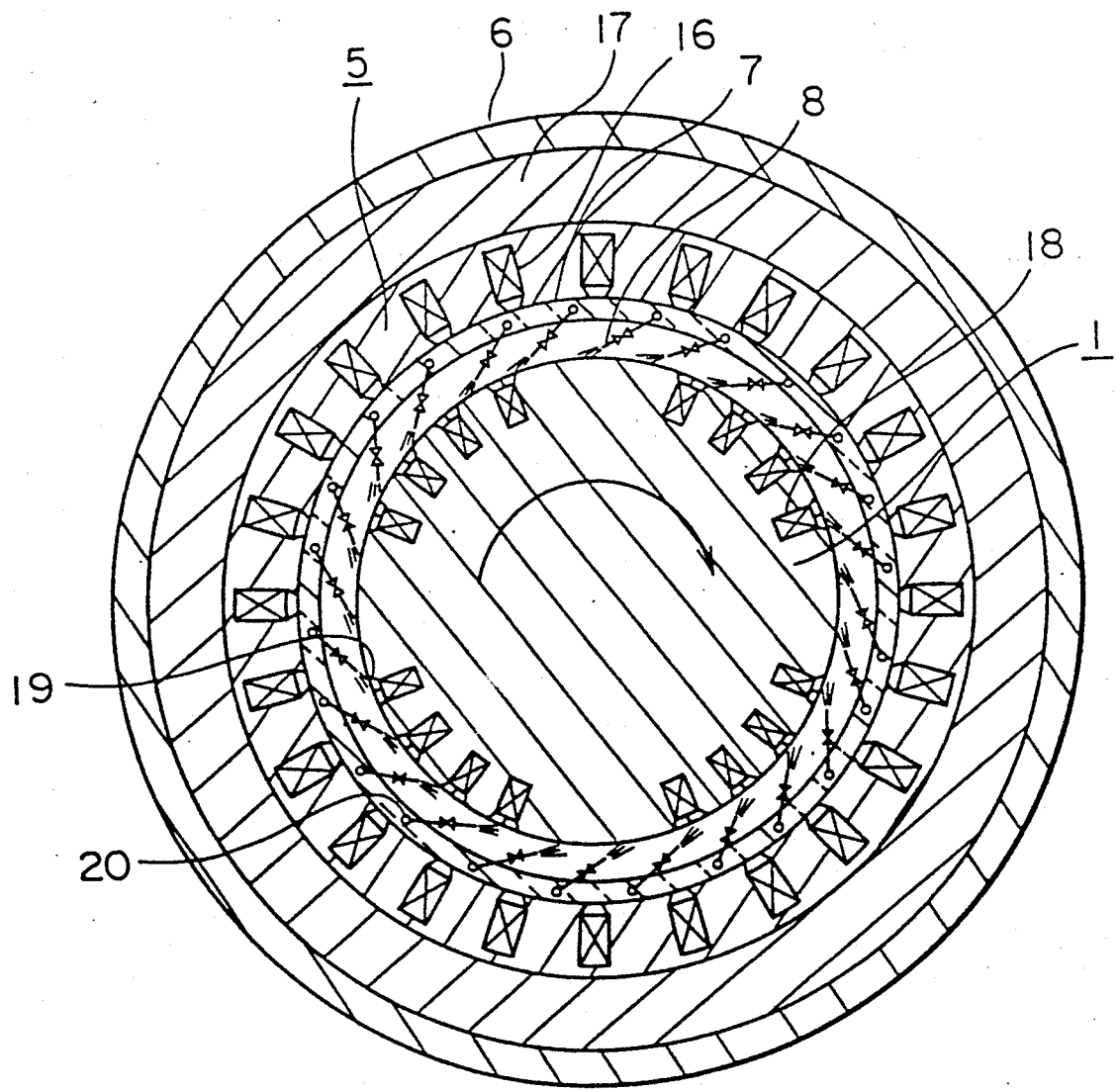
FIG. 10 is a transverse cross-sectional view of a portion of a sixth embodiment of the present invention.

FIG. 10 is a transverse cross-sectional view of a portion of another embodiment of the present invention. The overall structure of this embodiment is similar to that of the embodiment of FIG. 7, and as in that embodiment, the nozzles 8 are sloped with respect to the surface of the rotor 1. However, instead of being sloped in the direction of rotation of the rotor 1, the nozzles 8 are sloped in the direction opposite to the direction of rotation (indicated by the arrow). The reason for this orientation of the nozzles 8 is that the cooling effect produced by a stream of coolant striking a surface increases as the speed of impact increases. By sloping the nozzles 8 in the direction opposite from the direction of rotor rotation, the relative speed of the spray of coolant from the nozzles 8 and the surface of the rotor 1 is increased, thereby increasing the cooling effect.

In each of the above embodiments, the present invention is in the form of a superconducting generator, but the present invention may be in the form of other types of superconducting rotating electric machines, including both synchronous and induction types.

What is claimed is:

1. A cooling system for a rotating electrical machine having a rotor with an outer surface and a superconducting rotor winding having a critical temperature below which the rotor winding is superconducting, a stator surrounding the rotor, and a stator winding supported by the stator, the cooling system comprising cooling means for spraying a liquid coolant having a boiling point no higher than the critical temperature of said superconducting rotor winding at the outer surface of the rotor.

2. The cooling system of claim 1 wherein said cooling means comprises:
   a plurality of spraying elements opposing the outer surface of the rotor; and
   coolant supply means for supplying liquid coolant under pressure to the spraying elements.

3. The cooling system of claim 2, wherein said spraying elements are nozzles.

4. The cooling system of claim 2, wherein said spraying elements are orifices.

5. The cooling system of claim 2 wherein each spraying element is oriented to discharge a spray of liquid coolant perpendicular to the outer surface of the rotor.

6. The cooling system of claim 2, wherein each spraying element is oriented so that the center of a spray discharged therefrom is oblique to the outer surface of said rotor.

7. The cooling system of claim 6 wherein each spraying element is oriented so that the center of the spray discharged therefrom is oriented in the direction of rotation of the rotor.

8. The cooling system of claim 7 wherein each spraying element is oriented so that the center of the spray discharged therefrom is tangential to the outer surface of the rotor.

9. The cooling system of claim 7 wherein each of said spraying elements is oriented so that the direction of the center of the spray discharged therefrom has a component along the axis of rotation of the rotor.

10. The cooling system of claim 6 wherein each spraying element is disposed so that the direction of the center of the spray discharged therefrom is oriented opposite from the direction of rotation of the rotor.

11. The cooling system of claim 1 comprising a plurality of guides for the liquid coolant secured to the outer surface of the rotor, each of said guides extending outwardly from the rotor and oriented in the direction of rotation of the rotor.

12. The cooling system of claim 1 comprising:
   a plurality of coolant supply pipes embedded in the stator winding; and
   means for supplying the liquid coolant through the coolant supply pipes.

* * * * *